US009018341B2

(12) United States Patent
Paping et al.

(10) Patent No.: US 9,018,341 B2
(45) Date of Patent: Apr. 28, 2015

(54) METHOD FOR TREATMENT OF SYNTHETIC RUBBER PRODUCTS, A SYSTEM FOR TREATMENT, THE RESULTING RUBBER PRODUCTS, AND USE OF A METHOD TO REDUCE TYPE IV ALLERGENICITY OF RUBBER PRODUCTS

(75) Inventors: Michiel Inno Paping, Heemskerk (NL); Karen-Marlies Schenck, Amsterdam (NL)

(73) Assignee: Budev B.V., Halfweg (NL)

( * ) Notice: Subject to any disclaimer, the term of this patent is extended or adjusted under 35 U.S.C. 154(b) by 0 days.

(21) Appl. No.: 14/122,064

(22) PCT Filed: May 24, 2012

(86) PCT No.: PCT/NL2012/050364
§ 371 (c)(1),
(2), (4) Date: Jan. 30, 2014

(87) PCT Pub. No.: WO2012/161578
PCT Pub. Date: Nov. 29, 2012

(65) Prior Publication Data
US 2014/0194586 A1    Jul. 10, 2014

(30) Foreign Application Priority Data

May 25, 2011    (NL) .................................... 2006847

(51) Int. Cl.
*C08G 64/00*    (2006.01)
*C08C 3/02*    (2006.01)
*C08C 1/04*    (2006.01)
*C08C 2/02*    (2006.01)
*C08C 2/04*    (2006.01)
C08G 63/02    (2006.01)

(52) U.S. Cl.
CPC ... *C08C 3/02* (2013.01); *C08C 1/04* (2013.01); *C08C 2/02* (2013.01); *C08C 2/04* (2013.01)

(58) Field of Classification Search
USPC ................. 134/25.4, 201; 526/340.2; 528/488
See application file for complete search history.

(56) References Cited

U.S. PATENT DOCUMENTS

| 5,691,446 A | 11/1997 | Dove |
| 5,741,885 A | 4/1998 | Dove |
| 2003/0236348 A1 | 12/2003 | Wendling et al. |
| 2007/0083036 A1 | 4/2007 | Sharivker et al. |
| 2011/0162676 A1 | 7/2011 | Feil et al. |

FOREIGN PATENT DOCUMENTS

EP    1334992    8/2003

OTHER PUBLICATIONS

Food Code 1995 Food Drug Administration 2009, http://www.allergyfoundation.ca/index.php).*
Center for Disease Control and Prevention: Guideline for Disinfection and Sterilization in Healthcare Facilities, 2008: Cleaning: http://www.cdc.gov/.*
Sussman et al. Canadian Allergy, Asthma and Immunology Foundation; (http://www.allergyfoundation.ca/index.php).*
Sussman et al. Canadian Allergy, Asthma and Immunology Foundation; (http://www.allergyfoundation.ca/index.php) 1994.*
International Search Report in PCT/NL2012/050364, Jul. 25, 2012.
Written Opinion of the International Searching Authority in PCT/NL2012/050364, Nov. 25, 2013.
International Preliminary Report on Patentability in PCT/NL2012/050364, Nov. 26, 2013, mailed Dec. 5, 2013.

* cited by examiner

*Primary Examiner* — Terressa Boykin
(74) *Attorney, Agent, or Firm* — Cook Alex Ltd.

(57) ABSTRACT

The present invention relates to a method of reducing type IV rubber allergy of synthetic rubber latex products caused by chemical residues remaining after manufacture of the synthetic rubber products by reducing levels of chemical residues found for said products, said method comprising the steps of: subjecting said products to a wash in a strong alkaline solution to remove the chemical residues remaining after manufacture of the rubber latex products, and a system for reducing type IV allergenicity of synthetic rubber products caused by chemical residues remaining after manufacture of the synthetic rubber latex products by reducing residual levels of chemical residues found for said products, and a product, such as a glove, manufactured from synthetic rubber latex processed in accordance with the method and/or using the system. Further the invention relates to a use of a method of subjecting products to said wash and raising the temperature to at least 100 C to remove the chemical residues remaining after manufacture of the synthetic rubber products.

21 Claims, No Drawings

METHOD FOR TREATMENT OF SYNTHETIC RUBBER PRODUCTS, A SYSTEM FOR TREATMENT, THE RESULTING RUBBER PRODUCTS, AND USE OF A METHOD TO REDUCE TYPE IV ALLERGENICITY OF RUBBER PRODUCTS

TECHNICAL FIELD OF THE INVENTION

Synthetic rubbers are being used for many products in for instance the health care industry, such as surgical and examination gloves, and for manufacturing prophylactics, such as condoms.

Due to the stretchability, the natural feeling touch, its barrier properties including puncture resistance and even some self sealability after a puncture, Synthetic Rubber is one of a limited number of preferred materials for examination gloves and surgical gloves.

For natural Rubber Latex (NRL) it is known that latex sap harvested from the *Hevea Brasiliensis* tree contains proteins, which are functional for the stability of the latex suspension used in production of such products, for instance by dipping and/or molding. However, such proteins give rise to allergic reactions to sensitive people coming into physical contact with products made of this natural material. These allergies are commonly referred to as type I latex allergy.

As a countermeasure (the use of) many types of synthetic rubber materials has been proposed to replace the NRL. Such synthetic rubber materials are for example: nitril, vynil en polypropylene, or other materials like poly-isoprene, and combinations of such synthetic materials.

However, in production of synthetic rubber latex products, chemicals are used, mostly known as accelerators. Merely by way of example, such accelerators are for instance migratable N-nitrosamines, BHA, BHT, DPG, DPT, MBT, TMTD, ZDBC, ZDEC, ZDMC, ZMBI, ZMBT en ZPMC. These identifications/abbreviations of accelerators are well known to the skilled person.

In finished synthetic rubber products, residues of such chemicals may remain present. This is the cause of another type of allergy, commonly referred to as type IV latex allergy related to synthetic rubber latex products, also known as allergic contact dermatitis. While producers of such products claim to have resolved the problems of type I latex allergy by processing NRL products in a specific manner or by employing alternative materials such as synthetic rubbers, in truth the problems with type IV latex allergy are not countered.

From WO-2010/027261 a method and system are known for combating Type I allergenicity by reducing residual proteins in or on natural rubber latex products. Even though WO-2010/027261 relates to combating Type I allergenicity, the disclosure of this publication provides no hint or incentive to the skilled person to even contemplate employing the method and system known therefrom for any other purpose than for combating Type I allergenicity.

BACKGROUND OF THE INVENTION

This type IV allergic sensitivity of specific persons to the material of synthetic rubber products and more in particular chemical residues and even more in particular residues of accelerators, remaining after manufacture of these rubber products, has become a major problem in the health care industry.

SUMMARY OF THE INVENTION

The present invention is directed at resolving other problems than those underlying the prior art methods. More in particular, a solution is presented to the problems related to type IV rubber allergy, with which it is possible to reduce the amount of chemical residues, in particular residual accelerators, remaining after manufacture of the synthetic rubber products to extraordinarily low and even undetectable levels, according to the most modern and sensitive analyses methods. Thus, according to the invention it has become possible to achieve results which have never been reached before, at least not without affecting the physical or mechanical properties of the synthetic rubber matrix.

According to the present invention, as a solution to the problems of type VI allergy, as mentioned above, the method according to the appended independent method claim is applied to the synthetic rubber products after the production process. Due to the fact that no formulation changes are introduced of an synthetic rubber suspension or step in the production process of synthetic latex rubber products, the processability is being maintained while the physical and mechanical properties of resulting products are not altered. This method is capable of removing chemical residues of accelerators and the like as used in production of the synthetic rubber products to undetectable levels, by just adding or altering one washing step according to the invention after the production process to remove the residual chemicals. Further the invention relates to a system for treatment of rubber products as well as the resulting products. Further, the invention relates to a use of a method of washing products in an alkaline solution and raising the temperature thereof to at least 100° C. for synthetic rubber products and reducing Type IV allergenicity thereof.

According to the present invention the conditions considered necessary are applied to very effectively wash away the chemical residues, in particular residual accelerators, remaining after manufacture of the synthetic rubber products.

The presented method mainly results in highly efficient removal of the residual chemicals not only at the surface of but also inside a product made from synthetic rubber.

The required level of chemical residue removal also inside the material of the products is achieved by washing the product using an alkaline solution at elevated temperatures above 100° C. Washing using alkaline solution at room temperature, or washing using elevated temperatures and a neutral pH, does not reduce levels of residual chemicals more than 99%, even at long contact times (e.g. 1 day). Washing at 118° C. and pH 14, for example during 1 hour or considerably less and preferably under pressure (e.g. 2 atm.) to keep the solution from boiling/evaporating, reduces the levels of residual chemicals to undetectable levels, while deterioration of the synthetic rubber material is entirely prevented.

When looking at the actual chemical residue levels of a synthetic rubber product, washing at pH 14 and 118° C. for 1 hour, preferably under sufficient pressure to keep the alkaline solution in a fluid phase, removes all chemical residues remaining after manufacture of the synthetic rubber products to levels which are below the current detection limits using for instance amino acid analysis HPLC. For instance no residual levels are detectable of type IV rubber allergy causes like the residual chemicals BHA, BHT, DPG, DPT, MBT, TMTD, ZDBC, ZDEC, ZDMC, ZMBI, ZMBT and ZPMC. It is noted that the amino acid analysis HPLC has detection limits of 10 µg/g for practically all these type IV rubber allergy causing residual chemicals, except for ZDEC, for which the lowest detection level is 2 µg/g.

Thus according to the invention as defined in the appended claims, in particular the independent claims, a new washing procedure has been developed for synthetic rubber products.

A washing process (on an aqueous basis) according to the present invention was tested on medical gloves. At testing, for both powdered and non-powdered gloves, removal of practically all residual chemicals, in particular accelerators, from the gloves after the treatment was noticeably detected. More accurately it is noted, that quantities of the major type IV rubber allergy causes remaining after manufacture of the synthetic rubber products were all below the detection limits of for instance the amino acid analysis HPLC.

The washing process has been investigated with respect to the material properties of the resulting synthetic rubber, and the result is that the method according to the invention does not affect the mechanical properties at all, and is considered to be technically and economically feasible on a large scale production level.

It was found that, for synthetic rubber gloves, the current new washing process reduced the chemical residues, in particular accelerators, to zero, or at least a level undetectable with current and presently common testing methods, as determined by amino acid analysis HPLC.

The gloves treated in accordance with the new method of the present invention were further also tested to determine the Stress-strain curves of these treated gloves. This did not show any changes in mechanical properties of the gloves, which could have resulted from the new method according to the present invention. In particular it is noted, that boiling/evaporation of the alkaline solution at an elevated temperature of 100° C. or more for washing the products therein, could have had an adverse effect on the synthetic rubber material itself, as well as the colour and the mechanical properties thereof. Salty alkalines could then have been freed to affect the synthetic rubber material, rather than to only clean the synthetic rubber products from the chemical residues, in particular the accelerators, remaining after manufacture therein or -on, which is effectively prevented by keeping the solution from boiling or at least keeping salty alkalines from being freed. This, and similar considerations with respect to gasses freed upon boiling of the solution, refrained the skilled person in the past from attempting to raise the temperature to the levels according to the present invention, to reduce type IV rubber allergy causes.

Pressurization provides a possible means for keeping the solution from boiling and thus prevent damage to the product material from exposure to the gas and freed salty alkalines, which occur at boiling of the alkaline solution. Possibly for this pressurization a pressure tank or vessel may be employed, but alternatives are readily available to the skilled person. As an alternative for pressurization, the skilled person may contemplate adding an additive to the alkaline solution, for raising the boiling point thereof and/or keep salty alkalines from being freed at the elevated temperatures, to prevent the material from being affected thereby during the treatment thereof.

It is noted that the skilled person according to the state of the art disclosures had no incentive to attempt elevated temperatures to above 100° C. in combination with either of an elevated pressure and boiling point raising additives for removing type IV rubber allergy causes. In stead it is strongly suspected that the skilled person, having the pressure free preceding production steps of dipping or molding in mind, would have sooner had an inclination to find an alternative additive or compound, that under prior art production processes is used as an accelerator and also left.

Thus, the obtained results are unique and very promising. Moreover, the method is considered to be applicable and affordable in practice. The new method of the present invention can be upscaled and made suitable for the current large scale production practice without undue burden. Several different options are considered to be applicable for the new method of the invention: the method can be used as an additional step, or replace existing steps. Further, the new method is anticipated to result in beneficial economic effects, which may positively affect cost price, and may lead to lower prices, if the method can be used to replace a more expensive step in the production.

DETAILED DESCRIPTION OF PREFERRED EMBODIMENTS

Below a number of not-limiting examples of embodiments of the invention are described.

Example 1

In a first comparative example of the state of the art synthetic rubber products are washed in a strong alkaline suspension. The products have been previously manufactured by dipping a mold into a synthetic rubber suspension. After manufacture, the product is washed in a strong alkaline solution. The alkaline solution had a pH of 10. The temperature of the solution is elevated to approximately 30 degrees. The product is washed in the solution for 10 minutes. Hardly any improvement is then detectable with respect to type IV rubber allergy causes.

Example 2

In a second comparative example synthetic rubber products are washed in a strong alkaline suspension. The products have been previously manufactured by molding a synthetic rubber suspension, where the suspension is injected or otherwise introduced into a mold. After manufacture, the product is washed in a strong alkaline solution. The alkaline solution has a pH of 10. The temperature of the solution is elevated, before or even during washing, to approximately 30 degrees. The product is washed in the solution for 10 minutes. Hardly any improvement is detectable with respect to type IV rubber allergy causes.

Example 3

In another comparative example, the method is the same as either of examples 1 and 2, with as a difference that the time of washing is increased to 1 hour, where again hardly any increase in effectiveness was detectable.

Example 4

In this comparative example the washing time is increased one day, and all other features remain unchanged relative to example 3. Again, hardly any increase in effectiveness was detectable.

Example 5

In this comparative example, the method is the same as any one of the examples 1, 2, 3 and 4, with as a difference that the strength of the alkaline solution is increased to a pH of 14. Again, hardly any increase in effectiveness was detectable.

Example 6

In this comparative example, all features of examples 1-5 are unaltered, except that the temperature is raised to 50° C.

Again, hardly any improvement of the method in terms of effectiveness thereof was detectable.

Example 7

In this comparative example, all features of examples 1-5 is unaltered, except that the temperature is raised to 70° C. Again, hardly any improvement of the method in terms of effectiveness thereof was detectable.

Example 8

In this first embodiment of the invention according to this example, all features of examples 1-5 are unaltered, except that the temperature is raised to above 100° C. The method according to this embodiment of the invention exhibited an unexpected but distinct increase in effectiveness of the method with respect to type IV rubber allergy causes.

Example 9

In the second embodiment of the invention according to this example, all features of examples 1-5 are unaltered, except that the temperature is raised to 110° C. The method according to this embodiment of the invention exhibited an similar increase in effectiveness of the method as example 8 with respect to type IV rubber allergy causes.

Example 10

In the third embodiment of the invention, all features of examples 1-5 are unaltered, except that the temperature is raised to approximately 118° C. The method according to this embodiment of the invention exhibited an similar increase in effectiveness of the method as example 8 with respect to type IV rubber allergy causes.

Example 11

In this fourth embodiment of the invention, the features of any one of the examples 6-10 are the same, with the exception that a pressure vessel, such as an autoclave, is used to contain the strong alkaline solution (pH=10 or 14, with one of NaOH and KOH having a concentration of at least 0.01M). In the vessel pressure is increased to keep the solution in fluid phase and prevent evaporation. The pressure in the vessel is, during treatment of the products, raised to more than one atm. (1.013*10^5 Pa). The pressure level was selected to keep evaporation and/or freeing salty alkalines from occurring; for instance at more than 1 atm. at a temperature of 100° C., more than 1.5 atm. at 110° C. and more than 2.0 atm. at 120° C. The method according to this embodiment of the invention exhibited an similar increase in effectiveness of the method as example 8 with respect to type IV rubber allergy causes, and reduced affect on the mechanical or other properties of the material of the product.

Example 12

The features are in this example the same as in the previous example, except the concentration of NaOH and/or KOH could also be taken as high as 1M. The method according to this embodiments of the invention exhibited a similar increase in effectiveness of the method as example 8 with respect to type IV rubber allergy causes.

Example 13

In addition to or instead of NaOH or KOH other nucleofillic substances can be used, such as H2O, OH, CH3-CH2-O—, I— and CN—. The method according to this embodiment of the invention exhibited an similar increase in effectiveness of the method as example 8 with respect to type IV rubber allergy causes.

Example 14

The features in this example are the same as in any one of the preceding examples. Additionally, in a step surfactants in a solution are provided and the product is washed or submerged in this solution. Such a surfactant may comprise or be SDS (sodium dodecyl sulfate). The method according to this embodiment of the invention exhibited an similar increase in effectiveness of the method as example 8 with respect to type IV rubber allergy causes.

Example 15

In addition to the steps in any one of the preceding examples, the products are subjected to an oxidative treatment, wherein for instance a chlorine solution is provided for the products to be washed or at least submerged in the solution.

In overview, a global summary of results of one of many series of tests, where these tests were performed at pH=14, is as follows:

| No | Chemical Test = amino acid analysis HPLC | Function | Detection limit (µg/g) | Detection Result |
|---|---|---|---|---|
| 1 | Buthylated hydroxyanisole (BHA) | Antioxidant | 10 | ND |
| 2 | Buthylated hydroxy toluene (BHT) | Antioxidant | 10 | ND |
| 3 | Diphenyl Guanidine (DPG) | Accelerator | 10 | ND |
| 4 | Diphenyl Thiourea (DPT) | Accelerator | 10 | ND |
| S | Mercaptobenzothiazole (MBT) | Accelerator | 10 | ND |
| 6 | Tetramethylthiuram disulphide (TMTD) | Accelerator | 10 | ND |
| 7 | Zinc dibutyldithiocarbamate (ZDBC) | Accelerator | 10 | ND |
| 8 | Zinc diethyldithiocarbamate (ZDEC) | Accelerator | 2 | ND |
| 9 | Zinc dimethyldithiocarbamate (ZDMC) | Accelerator | 10 | ND |
| 10 | Zinc mercaptobenzimidazole (ZMBI) | Accelerator | 10 | ND |
| 11 | Zinc mercaptobenzothiazole (ZMBT) | Accelerator | 10 | ND |
| 12 | Zinc pentamethylenedithiocarbamate (ZPMC) | Accelerator | 10 | ND |

NOTES. ND stands for "not detectable". The solution only reached higher temperatures than 100° C., for the temperature of the water in the solution cannot be increased to above 100° C., when at atmospheric pressure, unless a pressure vessel or boiling point increasing additive was employed (as in some embodiments of the invention). The employed test method was amino acid analysis HPLC, and the detection limits thereof are in the above table.

Based on the above results the improvement of the invention in terms of reducing type IV rubber allergy is made abundantly clear. After the preceding disclosure of the present invention, many additional and alternative embodiments will have become apparent to the skilled person, which are all considered to lie within the grasp of the skilled person on the basis of his common general knowledge and within the scope of protection for the present invention as defined in the appended claims, unless such further embodiments depart substantially in sprit or definition from these appended claims. For instance the skilled person could and would contemplate other temperatures, specifically higher temperatures than those specifically mentioned above, or only just at or slightly above 100° C. Also the step of powdering is not essential. However, a powdered product with hardly any or practically undetectable amounts of residual chemicals, such as accelerators, which constitute causes for type IV rubber allergies, will provide a strong indication of an embodiment of the invention as a consequence of the otherwise (without a method according to the invention) generally very high chemical residue content of such products and the present day common practice—prior to the present invention—of refraining, by many producers and users from powdering the products and using such powdered products. Also, many examples have been provided, and it is emphasized here that all combinations of distinctly presented embodiments are also within the scope of the invention.

The invention claimed is:

1. A method of reducing type IV rubber allergy of synthetic rubber products caused by chemical residues, in particular residual accelerators and/or antioxidants, remaining after manufacturing of rubber products by reducing levels of chemical residues found for said products, said method comprising the steps of:
   subjecting said rubber products to a wash in a strong alkaline solution to remove the chemical residues remaining after manufacture of the synthetic rubber products;
   raising the temperature of the strong alkaline solution to at least 100° C.; and
   pressurizing the strong alkaline solution keeping same in a fluid phase to prevent evaporation or boiling of at least water on the solution and/or freeing salty alkalines.

2. The method of claim 1, comprising:
   raising the temperature of the strong alkaline solution to 110° C. or higher.

3. The method of claim 1, comprising: pressurizing the strong alkaline solution to at least 1.5 atm.

4. The method of claim 3, comprising: pressurizing the strong alkaline solution to at least 2.0 atm.

5. A method of reducing type IV rubber allergy of synthetic rubber products caused by chemical residues, in particular residual accelerators and/or antioxidants, remaining after manufacturing of rubber products by reducing levels of chemical residues found for said products, said method comprising the steps of:
   subjecting said rubber products to a wash in a strong alkaline solution to remove the chemical residues remaining after manufacture of the synthetic rubber products;
   raising the temperature of the strong alkaline solution to at least 100° C.; and
   adding an additive to the strong alkaline solution to raise the boiling point of the alkaline solution and/or to prevent freeing salty alkalines.

6. The method of claim 1, wherein said strong alkaline solution has a pH of 10 or more.

7. The method of claim 1, wherein the chemical residue is at least one of the compounds from the group, comprising BHA, BHT, DPG, DPT, MBT, TMTD, ZDBC, ZDEC, ZDMC, ZMBI, ZMBT and ZPMC.

8. The method of claim 1, wherein said strong alkaline solution is a solution of NaOH or KOH in a concentration of 0.01M or higher.

9. The method of claim 1, wherein said strong alkaline solution comprises at least one nucleofile from the group, which at least comprises H2O, OH, CH3-CH2-O—, I— and CN—.

10. The method of claim 1, wherein the step of subjecting said products to a wash in a strong alkaline solution is maintained for at least five minutes.

11. The method of claim 1, further comprising powdering the product, for instance with talcum powder or starch.

12. System for executing the method according to claim 1 to reduce type IV allergenicity of synthetic rubber products caused by chemical residues, in particular residual accelerators and/or anti-oxidants, remaining after manufacture of the rubber products by reducing levels of chemical residues found for said products, said system comprising:
   a vessel comprising a strong alkaline solution to remove chemical residues remaining after manufacture of the synthetic rubber products.

13. The system of claim 12, where the vessel is a pressure vessel.

14. A product, such as a glove or condom, manufactured from synthetic rubber and subjected to a method as defined in claim 1, the product after subjection to the method exhibits a level of chemical residues, such as accelerators and/or anti-oxidants, lower than 10.0 μg/gram.

15. The product as defined in claim 14, wherein the product is manufactured from at least one synthetic rubber from the group of materials comprising: nitril, vynil en polypropylene, or other materials like poly-isoprene, and combinations of such synthetic materials.

16. A method of processing of synthetic rubber products to reduce type IV rubber allergy of the synthetic rubber products, which is caused by chemical residues, in particular residual accelerators and/or antioxidants employed during production of the synthetic rubber products and of which chemical residues remain after manufacture of the rubber products, comprising removing the chemical residues remaining after manufacture of the synthetic rubber products by the steps of:
   subjecting said rubber products to a wash in a strong alkaline solution;
   raising the temperature of the strong alkaline solution to at least 100° C.; and
   keeping, by either pressurizing or adding an additive to, the strong alkaline solution in a fluid phase without evaporation or boiling and/or freeing salty alkalines.

17. The method of claim 1, comprising raising the temperature of the strong alkaline solution to approximately 118° C.

18. The method of claim 1, wherein said strong alkaline solution has a pH of approximately 14.

19. The method of claim 1, wherein said strong alkaline solution is a solution of NaOH or KOH in a concentration of approximately 1M.

20. The method of claim 1, wherein the step of subjecting said products to a wash in a strong alkaline solution is maintained for at least one hour.

21. The product of claim 14, wherein the product after subjection to the method exhibits a level of chemical residues, such as accelerators and/or anti-oxidants, lower than 7.0 μg/gram, lower than 4.0 μg/gram, or lower than 2.0 μg/gram.

* * * * *